(12) United States Patent
Kaneyasu et al.

(10) Patent No.: US 8,370,085 B2
(45) Date of Patent: Feb. 5, 2013

(54) DEVICE, METHOD, AND PROGRAM FOR DETECTING POSITION

(75) Inventors: Kensaku Kaneyasu, Tochigi (JP); Yasuhiro Kawai, Tochigi (JP); Kazuhiko Yamaashi, Tochigi (JP)

(73) Assignee: Honda Motor Co., Ltd., Tokyo (JP)

( * ) Notice: Subject to any disclaimer, the term of this patent is extended or adjusted under 35 U.S.C. 154(b) by 258 days.

(21) Appl. No.: 12/851,135

(22) Filed: Aug. 5, 2010

(65) Prior Publication Data
US 2011/0035183 A1 Feb. 10, 2011

(30) Foreign Application Priority Data

Aug. 6, 2009 (JP) ................... 2009-183829
Aug. 6, 2009 (JP) ................... 2009-183839
Aug. 6, 2009 (JP) ................... 2009-183842

(51) Int. Cl.
*G01N 29/07* (2006.01)
(52) U.S. Cl. .......................................................... 702/39
(58) Field of Classification Search ...................... 702/39
See application file for complete search history.

(56) References Cited

FOREIGN PATENT DOCUMENTS

| JP | 06-102350 | 4/1994 |
| JP | 06-137850 | 5/1994 |
| JP | 2004-138481 | 5/2004 |
| JP | 2004-144719 | 5/2004 |
| JP | 2005-265669 | 9/2005 |

OTHER PUBLICATIONS

P. Boltryk, An ultrasonic transducer array for velocity measurement in underwater vehicles, 2004 Elsevier B.V., p. 473-478.*
Ultrasonic Sensors in Air, Valentin Magori, Corporate Research and Development, Siemens AG, Munich, Germany, 1994 IEEE, 1994 Ultrasonics Symposium, p. 471-481.*

* cited by examiner

*Primary Examiner* — Tang S Lau
(74) *Attorney, Agent, or Firm* — Rankin, Hill & Clark LLP

(57) ABSTRACT

Sonic wave speed at a part is calculated considering the environment surrounding the part, sonic wave speed around the part is measured, and the accuracy of the position detection is improved. An ultrasonic wave transmitting device is arranged at a robot hand tip, hexahedrons which can contain the tip are set, and the ultrasonic wave transmitting-receiving devices are arranged at the top points thereof. Upon detecting the tip position, a top point that is close to the tip is selected as a specific point, and sonic wave speeds from other top points to this specific point are calculated. Based on these sonic wave speeds, sonic wave speed along a route from the tip to the specific point is calculated. Based on this sonic wave speed value and spread time of ultrasonic waves between the tip and the specific point, distance from the specific point to the tip is calculated.

12 Claims, 5 Drawing Sheets

$L_2 < L_3 < L_1$

DEVICE, METHOD, AND PROGRAM FOR DETECTING POSITION

BACKGROUND OF THE INVENTION

1. Technical Field

The present invention relates to a technique for detecting, for example, a tip of a robot arm by ultrasonic waves, and relates to a technique in which detection error due to the effects of sonic speed is reduced.

2. Background Art

A technique in which the three-dimensional position of an object is detected by using ultrasonic waves is known (See Reference 1 below). In this technique, for example, an ultrasonic wave generating device is arranged at a part to be detected (detection target), and ultrasonic wave signals generated therefrom are received at three distinguishably different points. At that time, by measuring the time required for the ultrasonic waves to move through the air at the three points, distances r1 to r3 from the three points to the detection target can be calculated. By describing three spheres, each having a central point of one of the three points and a radius of r1, r2, and r3, the point at which these spheres intersect can be specified as the position of the detection target.

Reference 1: Japanese Unexamined Patent Application Publication No. Heisei 06 (1994)-102350.

SUMMARY OF THE INVENTION

The above-mentioned technique to specify position by using ultrasonic waves is affected by the speed of the sonic waves. The sonic wave speed is affected by temperature, pressure, humidity, density (atmospheric pressure), and flow (wind) in the air. Therefore, in circumstances in which the above-mentioned parameters affecting the sonic wave speed are unstable, the accuracy of the detection of position using sonic waves is deteriorated.

For example, in the field of production in which a robot arm is used, a technique to detect the position of the tip of the robot arm is necessary. In such an environment, temperature, humidity, flow of air or the like may vary depending on place and time. In that case, if the technique to detect position by using sonic waves is employed, errors may occur in data regarding the position detected, depending on changes in sonic waves, as mentioned above.

In view of such circumstances, an object of the present invention is to provide a technique in which sonic wave speed around a position of a detection target is measured as accurately as possible and the detection accuracy of the position is increased by using the result.

The invention according to a first aspect of the invention is a position detecting device having an ultrasonic wave transmitting device arranged at a part to be detected, plural ultrasonic wave transmitting and receiving devices arranged around the part to be detected, and a sonic wave speed calculating device for calculating sonic wave speed among the plural ultrasonic wave transmitting and receiving devices and further calculating sonic wave speed at the part to be detected depending on the sonic wave speed among the plural ultrasonic wave transmitting and receiving devices. The position detecting device also includes a distance calculating device for calculating a distance from the ultrasonic wave transmitting device arranged at the part to be detected to a specific ultrasonic wave transmitting and receiving device, depending on a spread time of the ultrasonic wave from the ultrasonic wave transmitting device arranged at the part to be detected to the specific ultrasonic wave transmitting and receiving device included in the plural ultrasonic wave transmitting and receiving devices and depending on the sonic wave speed at the part to be detected.

In the invention according to the first aspect of the invention, first, sonic wave speed among, the plural ultrasonic wave transmitting and receiving devices arranged around the part to be detected is calculated, and furthermore, sonic wave speed at the part to be detected is calculated depending on the sonic wave speed among the plural ultrasonic wave transmitting and receiving devices. Ultrasonic waves transmitted from the part to be detected are received at the specific ultrasonic wave transmitting and receiving device, and the distance r therebetween is calculated by the spread time. Since the part to be detected is on a sphere having radius r and has the specific ultrasonic wave transmitting and receiving device as its center, the position of the part to be detected can be specified thereby.

The invention according to a second aspect of the invention is a position detecting device, wherein the plural ultrasonic wave transmitting and receiving devices are arranged at top points of a polyhedron, and the part to be detected is inside the polyhedron, in accordance with the first aspect of the invention. In the invention of the second aspect of the invention, the ultrasonic wave transmitting and receiving devices are arranged at top points of a polyhedron, and the part to be detected is inside the polyhedron. In this construction, the position of the part to be detected can be specified by calculating the distance from the top point of the polyhedron to the position of the part to be detected.

The invention according to a third aspect of the invention is a position detecting device, wherein the plural ultrasonic wave transmitting and receiving devices are arranged at the top points of plural polyhedrons, the part to be detected is contained in one of the plural polyhedrons, and the sonic wave speed calculating device calculates sonic wave speed at the part to be detected depending on sonic wave speed between the plural ultrasonic wave transmitting and receiving devices arranged at the plural top points of the polyhedron containing the part to be detected, in accordance with the first aspect of the invention. The invention according to the third aspect of the invention has a construction in which plural polyhedrons are prepared and the part to be detected is contained in one of them.

The invention according to a fourth aspect of the invention is a position detecting device, wherein one of the plural ultrasonic wave transmitting and receiving devices is used as a receiving device, another of the plural ultrasonic wave transmitting and receiving devices is used as a transmitting device, the sonic wave speed calculating device calculates sonic wave speed between the transmitting device and the receiving device and calculates sonic wave speed at the part to be detected depending on the sonic wave speed between the transmitting device and the receiving device calculated, and the distance calculating device calculates the distance between the part to be detected and the receiving device depending on the sonic wave speed at the part to be detected and depending on the spread time of which the transmitted wave from the ultrasonic wave transmitting device arranged at the part to be detected is received at the receiving device, in accordance with the first aspect of the invention. In the invention according to the fourth aspect of the invention, the receiving device used in the calculation of the sonic wave speed between the ultrasonic wave transmitting and receiving devices is also used as a device for receiving ultrasonic waves transmitted from the part to be detected.

The invention according to a fifth aspect of the invention is a position detecting device, wherein the receiving device is an ultrasonic wave transmitting and receiving device which is closest to the part to be detected, among the plural ultrasonic wave transmitting and receiving devices, in accordance with the fourth aspect of the invention.

The invention according to a sixth aspect of the invention is a position detecting device, further has a position calculating device, wherein the position calculating device selects the mutually different three ultrasonic wave transmitting and receiving devices as the receiving device, calculates the distances between the part to be detected and the receiving device as three values corresponding to the mutually different three ultrasonic wave transmitting and receiving devices respectively, and calculates position of the part to be detected depending on an intersecting point of three spheres each having the three value as a radius, according to the fourth or fifth aspect of the invention.

In the invention according to the sixth aspect, the three ultrasonic wave transmitting and receiving devices function as receiving devices, and three distances between these three positions of receiving and the part to be detected are calculated. Depending on an intersecting point of the spheres, having a radius of r1, r2 or r3, and three center positions, the position of the part to be detected can be specified.

The invention according to a seventh aspect is a position detecting device, wherein line segments each connecting between the ultrasonic wave transmitting and receiving devices exist in plural, and sonic wave speeds at the plural line segments are calculated as sonic wave speeds between ultrasonic wave transmitting and receiving devices, and in the process calculating sonic wave speed at the part to be detected, a process in which sonic wave speed at a line segment relatively close to the part to be detected have large effect on sonic wave speed at the part to be detected and sonic wave speed at a line segment relatively far from the part to be detected have small effect on sonic wave speed at the part to be detected among sonic wave speeds at the plural line segments, is performed, in accordance with the first aspect of the invention.

In the invention according to the seventh aspect, upon calculating sonic wave speeds of plural routes between the plural ultrasonic wave transmitting and receiving devices arranged around the part to be detected, the sonic wave speed at the part to be detected is calculated based on a condition in which effects of sonic wave speed at these plural routes are weighted depending on a distance between each route and the part to be detected.

The invention according to an eighth aspect is a position detecting device, wherein the sonic wave speed at a line segment relatively close to the part to be detected is the sonic wave speed at the line segment closest to the part to be detected, in accordance with the seventh aspect of the invention.

The invention according to a ninth aspect is a position detecting device, wherein the plural line segments construct trigonal pyramids, and the part to be detected is contained in the trigonal pyramid, in accordance with the seventh or eighth aspects.

The invention according to a tenth aspect is a position detecting device, wherein the calculation of sonic wave speed at the part to be detected by the sonic wave speed calculating device is performed by formula of L, in conditions in which length of vertical lines drawn from the part to be detected against one of the plural line segments is defined as $L_i$ (i is a natural number not including 0), $L=L_1+L_2+L_3 \ldots$, and by following formula of V in conditions that sonic wave speeds at each of the plural line segments are defined as vi (i is a natural number not including 0), according to one of the seventh to ninth aspects.

$$V = \frac{\frac{L}{L_1}}{\frac{L}{L_1}+\frac{L}{L_2}+\frac{L}{L_3}}v1 + \frac{\frac{L}{L_2}}{\frac{L}{L_1}+\frac{L}{L_2}+\frac{L}{L_3}}v2 + \frac{\frac{L}{L_3}}{\frac{L}{L_1}+\frac{L}{L_2}+\frac{L}{L_3}}v3$$

The invention according to an eleventh aspect is a position detecting device, wherein the part to be detected is a tip part of a robot hand, in addition to the invention according to the first through tenth aspects. By the invention according to the eleventh aspect, the position of the tip part of the robot hand can be detected.

The invention according to a twelfth aspect is a position detecting method having a step of calculating sonic wave speeds among plural ultrasonic wave transmitting and receiving devices arranged around a part to be detected and calculating sonic wave speeds at the part to be detected depending on the sonic wave speeds among plural ultrasonic wave transmitting and receiving devices. The method also includes a step of calculating a distance from the ultrasonic wave transmitting device arranged at the part to be detected to a specific ultrasonic wave transmitting and receiving device, depending on a spread time of ultrasonic waves from the ultrasonic wave transmitting device arranged at the part to be detected to the specific ultrasonic wave transmitting and receiving device included in the plural ultrasonic wave transmitting and receiving devices, and depending on the sonic wave speed at the part to be detected.

The invention according to a thirteenth aspect is a position detecting method, wherein one of the plural ultrasonic wave transmitting and receiving devices is used as a receiving device, another of the plural ultrasonic wave transmitting and receiving devices is used as a transmitting device, in the step of calculating sonic wave, sonic wave speeds between the transmitting device and the receiving device is calculated and sonic wave speed at the part to be detected is calculated depending on the sonic wave speed between the transmitting device and the receiving device, and in the step of calculating distance, distance between the part to be detected and the receiving device is calculated depending on sonic wave speed at the part to be detected and depending on the spread time of which the transmitted wave from the ultrasonic wave transmitting device arranged at the part to be detected is received at the receiving device, in accordance with the twelfth aspect.

The invention according to a fourteenth aspect is a position detecting method, wherein line segments each connecting between the ultrasonic wave transmitting and receiving devices exist in plural, sonic wave speeds at the plural line segments are calculated as sonic wave speeds between ultrasonic wave transmitting and receiving devices, and in the step of calculating sonic wave speed, a process in which sonic wave speed at a line segment relatively close to the part to be detected have large effect on sonic wave speed at the part to be detected and sonic wave speed at a line segment relatively far from the part to be detected have small effect on sonic wave speed at the part to be detected among sonic wave speeds at the plural line segments, is performed, in addition to the invention according to the twelfth aspect.

The invention according to a fifteenth aspect is a program which executes following processes by a computer, a process of calculating sonic wave speed among the plural ultrasonic wave transmitting and receiving devices and further calculating sonic wave speeds at the part to be detected depending on the sonic wave speeds among the plural ultrasonic wave transmitting and receiving devices. The program also includes a process of calculating a distance from the ultrasonic wave transmitting device arranged at the part to be detected to a specific ultrasonic wave transmitting and receiving device, depending on a spread time of ultrasonic waves from the ultrasonic wave transmitting device arranged at the part to be detected to the specific ultrasonic wave transmitting and receiving devices included in the plural ultrasonic wave transmitting and receiving devices and depending on the sonic wave speed at the part to be detected.

The invention according to a sixteenth aspect is a program, wherein one of the plural ultrasonic wave transmitting and receiving devices is used as a receiving device, another of the plural ultrasonic wave transmitting and receiving devices is used as a transmitting device, in the process of calculating sonic waves, sonic wave speed between the transmitting device and the receiving device is calculated and sonic wave speed at the part to be detected is calculated depending on the sonic wave speed between the transmitting device and the receiving device, and in the process of calculating distance, distance between the part to be detected and the receiving device is calculated depending on sonic wave speed at the part to be detected and depending on spread time of which transmitted waves from the ultrasonic wave transmitting device arranged at the part to be detected is received at the receiving device, in accordance with the fifteenth aspect.

The invention according to a seventeenth aspect is a program, wherein line segments each connecting between the ultrasonic wave transmitting and receiving devices exist in plural, sonic wave speeds at the plural line segments are calculated as sonic wave speeds between ultrasonic wave transmitting and receiving devices, and in the process of calculating sonic wave speed at the part to be detected, a process in which sonic wave speed at a line segment relatively close to the part to be detected have large effects on sonic wave speed at the part to be detected and sonic wave speed at a line segment relatively far from the part to be detected have small effects on sonic wave speed at the part to be detected among sonic wave speeds at the plural line segments, is performed, in accordance with the fifteenth aspect.

According to the invention according to the first aspect, since sonic wave speed of the part to be detected is calculated in addition to involving information of surrounding environment of the part to be detected, the sonic wave speed around the part to be detected can be measured as accurately as possible. Therefore, the position detecting device in which the position is detected with high accuracy by using sonic wave speeds around the part to be detected, can be provided.

According to the invention according to the second aspect, since the transmitting and receiving devices position at the top points of a polyhedron and the line segments which connects the top points exist near the part to be detected, detection of position in which information of the surrounding environment of the part to be detected can be performed more accurately.

According to the invention according to the third aspect, since there are plural polyhedrons, a space that is a target to be detected can be set more finely and the accuracy of position detection can be increased.

According to the invention according to the fourth aspect, since sonic wave speed of the part to be detected is calculated based on an actual measured value of sonic wave speed of close direction, the sonic wave speed around the part to be detected can be measured as accurately as possible. Therefore, the position detecting device in which position is detected at high accuracy by using sonic wave speeds around the part to be detected, can be provided.

According to the invention according to the fifth aspect, since sonic wave speed of the part to be detected is calculated based on an actual measured sonic wave speed of a part close to the part to be detected, the accuracy of position detection using sonic wave speed of the part to be detected can be increased.

According to the invention according to the sixth aspect, since data of distance is obtained from three parts, accuracy of the position data of the part to be detected calculated can be increased.

According to the invention according to the seventh aspect, since conditions in the environment are involved in consideration of degree of influence depending on distance from the part to be detected, accuracy of detection of sonic wave speeds around the part to be detected is increased. Therefore, the position detecting device in which position is detected at high accuracy by using sonic wave speeds around the part to be detected, can be provided.

According to the invention according to the eighth aspect, detection of position in which information of the environment surrounding the part to be detected can be performed more accurately.

According to the invention according to the ninth aspect, since sonic wave speed at the part to be detected inside of the trigonal pyramid is calculated based on sonic wave speed at the oblique side of the trigonal pyramid, calculation accuracy of the sonic wave speed at the part to be detected can be further increased.

According to the invention according to the tenth aspect, by the calculating a formula that is reflected by difference of degree of influence depending on distance, sonic wave speed at the part to be detected can be calculated.

According to the invention according to the eleventh aspect, detection accuracy of position at the tip part of the robot hand can be increased.

According to the invention according to the twelfth aspect, since sonic wave speed of the part to be detected is calculated in addition to information of the surrounding environment of the part to be detected, the sonic wave speed around the part to be detected can be measured as accurately as possible. Therefore, the position detecting method in which position is detected at high accuracy by using sonic wave speed around the part to be detected, can be provided.

According to the invention according to the thirteenth aspect, since sonic wave speed of the part to be detected is calculated based on an actual measured value of sonic wave speed of close direction, the sonic wave speed around the part to be detected can be measured as accurately as possible. Therefore, the position detecting method in which position is detected at high accuracy by using sonic wave speed around the part to be detected, can be provided.

According to the invention according to the fourteenth aspect, since condition of the environment is involved in consideration of degree of influence depending on distance from the part to be detected, accuracy of detection of sonic wave speed around the part to be detected is increased. Therefore, the position detecting method in which position is detected at high accuracy by using sonic wave speed around the part to be detected, can be provided.

According to the invention according to the fifteenth aspect, since sonic wave speed of the part to be detected is calculated in addition to involving information of the surrounding environment of the part to be detected, the sonic wave speed around the part to be detected can be measured as accurately as possible. Therefore, the program in which position is detected at high accuracy by using sonic wave speed around the part to be detected, can be provided.

According to the invention according to the sixteenth aspect, since sonic wave speed of the part to be detected is calculated based on an actual measured value of sonic wave speed of close direction, the sonic wave speed around the part to be detected can be measured as accurately as possible. Therefore, the program in which position is detected at high accuracy by using sonic wave speed around the part to be detected, can be provided.

According to the invention according to the seventeenth aspect, since conditions of the environment are involved in consideration of degree of influence depending on distance from the part to be detected, accuracy of detection of sonic wave speed around the part to be detected is increased. Therefore, the program in which position is detected at high accuracy by using sonic wave speed around the part to be detected, can be provided.

EXPLANATION OF REFERENCE NUMERALS

100: Robot hand system, 101: Robot hand, 102: Robot hand controlling device, 103: Position detecting device, 104: Tip part of robot hand, 110 to 126: Ultrasonic wave transmitting and receiving device (top points of regular hexahedron), 131 to 133: Regular hexahedron, 400: Regular hexahedron.

BEST MODE FOR CARRYING OUT THE INVENTION

Summary

Figure 1:
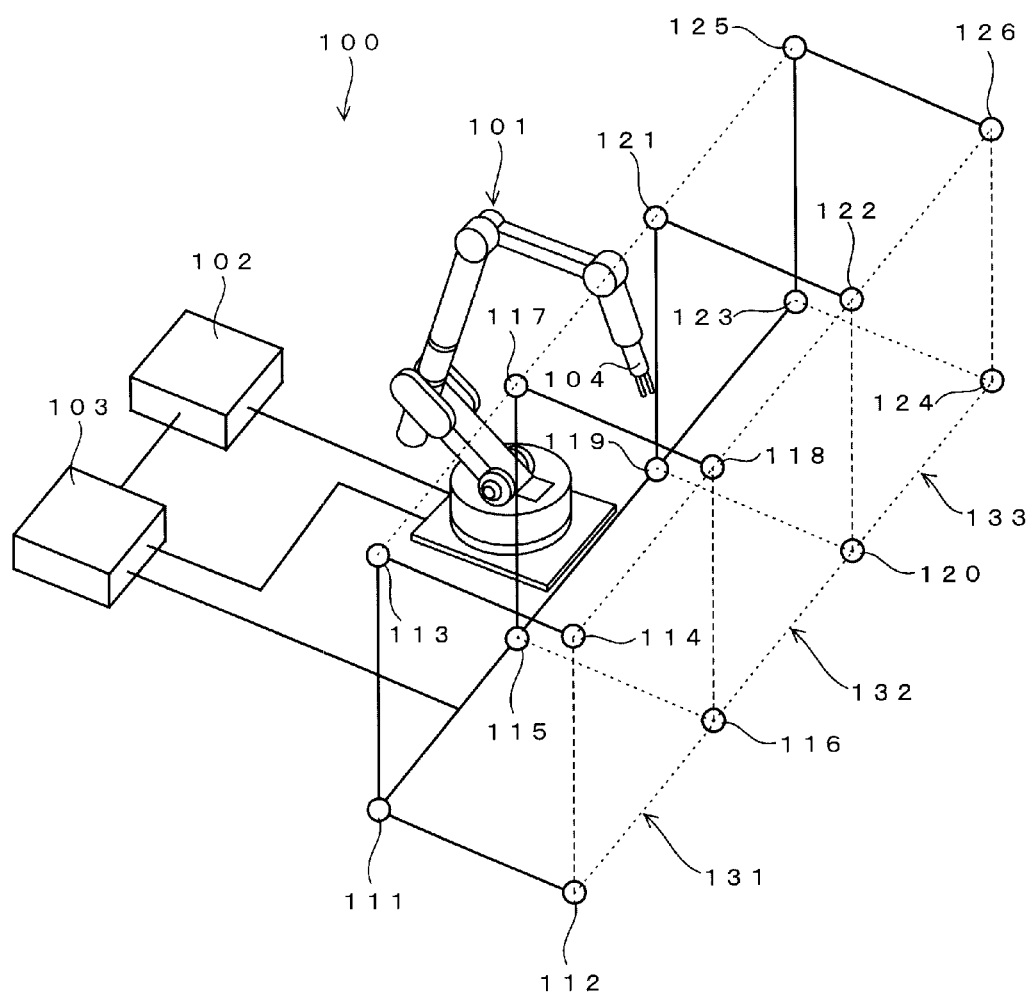
FIG. 1 is a conceptual diagram of the present embodiment.

In the present embodiment, as shown in FIG. 1, the ultrasonic wave transmitting device is arranged at the tip part 104 of the robot hand 101, and furthermore, the polyhedrons 131 to 133 which can contain the tip part 104 are set, and the ultrasonic wave transmitting and receiving devices 111 to 126 are arranged at each top point of the polyhedrons. In order to detect the position of the tip part 104, a top point which is close to the tip part 104 is selected as a specific point, and the sonic wave speed of a route from another top point to the specific point are calculated. Based on this sonic wave speed, the sonic wave speed along a route from the tip part 104 to the specific point is calculated, and based on this value of the sonic wave speed and the spread time of the ultrasonic wave between the tip part 104 and the specific point, the distance from the specific point to the tip part 104 can be calculated. By calculating distances from other specific points to the tip part in the same way, the position of the tip part 104 can be specified.

Overall Construction

FIG. 1 is a conceptual diagram of the present embodiment. FIG. 1 shows the robot hand system 100. The robot hand system 100 has the robot hand 101. The robot hand 101 has plural kinds of screwdrivers at its tip, and has a function to revolve a screw of a part being assembled. The function of the robot hand 101 is not particularly limited, and the function can be selected from conventional functions such as conveying, assembling, coating, and welding of parts.

The position of the robot hand 101 is controlled by the robot controlling device 102. The robot controlling device 102 receives information of position of the tip part 104 of the robot hand 101 in the three-dimensional space from the position detecting device 103, and controls the position of the robot hand 101 based on the information. Furthermore, the robot controlling device 102 outputs information of position of the tip part 104 of the robot hand upon controlling to the position detecting device 103.

The ultrasonic wave transmitting device is arranged at the tip part 104 of the robot hand 101. Action of this ultrasonic wave transmitting device is controlled by the position detecting device 103. Furthermore, the position detecting device 103 controls the action of sixteen ultrasonic wave transmitting and receiving devices 111 to 126 and processes the output signal transmitted therefrom. It should be noted that the frequency of the ultrasonic wave used is not limited to that used herein, and a frequency of several tens of kHz may be used.

The ultrasonic wave transmitting and receiving devices 111 to 126 form a detection space of a rectangular parallelepiped in which three regular hexahedrons 131 to 133 are joined. The regular hexahedrons 131 to 133 function as a unit detection space. At all the top points of each of regular hexahedrons 131 to 133, the ultrasonic wave transmitting and receiving devices 111 to 126 are arranged.

That is, the ultrasonic wave transmitting and receiving devices 111, 112, 113, 114, 115, 116, 117 and 118 are arranged at eight top points of the regular hexahedron 131. The ultrasonic wave transmitting and receiving devices 115, 116, 117, 118, 119, 120, 121 and 122 are arranged at eight top points of the regular hexahedron 132. The ultrasonic wave transmitting and receiving devices 119, 120, 121, 122, 123, 124, 125 and 126 are arranged at eight top points of the regular hexahedron 133.

In the stereoscopic space constructed by these three regular hexahedrons 131 to 133, the three-dimensional position of the tip part 104 of the robot hand 101 can be detected. The construction of the controlling system for this detection and the method for detection are explained below.

Construction of Controlling System

Figure 2:
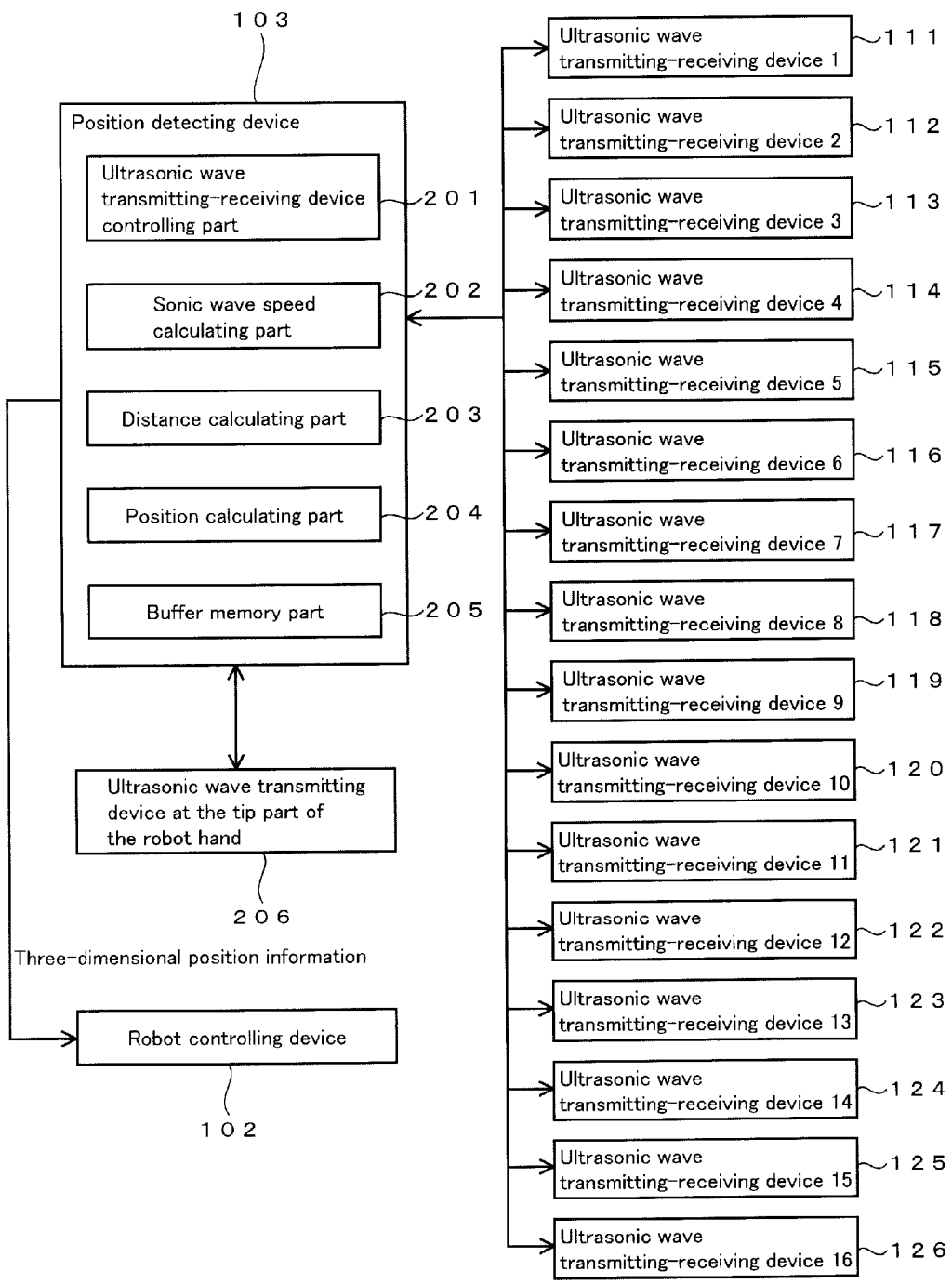
FIG. 2 is a block diagram of the present embodiment.

FIG. 2 is a block diagram showing a concept of the controlling system of the robot hand system of FIG. 1. FIG. 2 shows the position detecting device 103 of FIG. 1. The position detecting device 103 has a function as a computer, and includes CPU, memory, and interface. Furthermore, the position detecting device 103 stores a program for performing a below-mentioned action in the memory.

The position detecting device 103 has the ultrasonic wave transmitting and receiving device controlling part 201, the sonic wave speed calculating part 202, the distance calculating part 203, the position calculating part 204, and the buffer memory part 205. The ultrasonic wave transmitting and receiving device controlling part 201 controls action of the ultrasonic wave transmitting and receiving devices 111 to 126, upon detection of sonic wave speeds inside of the regular hexahedrons 131 to 133.

More practically, in the case in which sonic wave speed is detected inside of the regular hexahedron 131, the ultrasonic wave transmitting and receiving devices 111, 112, 113, 114, 115, 116, 117 and 118 are controlled by the ultrasonic wave transmitting and receiving device controlling part 201. In the case in which sonic wave speed is detected inside of the regular hexahedron 132, the ultrasonic wave transmitting and receiving devices 115, 116, 117, 118, 119, 120, 121 and 122 are controlled by the ultrasonic wave transmitting and receiving device controlling part 201. In the case in which sonic wave speed is detected inside of the regular hexahedron 133, the ultrasonic wave transmitting and receiving devices 119, 120, 121, 122, 123, 124, 125 and 126 are controlled by the ultrasonic wave transmitting and receiving device controlling part 201. Furthermore, the ultrasonic wave transmitting and receiving device controlling part 201 controls actions of the ultrasonic wave transmitting device 206 arranged at the tip part 104 of the robot hand 101.

The sonic wave speed calculating part 202 calculates sonic wave speed in the regular hexahedrons 131 to 133, and performs operations required for this calculation. The process performed in the sonic wave speed calculating part 202 is explained in detail below. The distance calculating part 203 calculates distance between the position of detection target (the tip part 104) and a specific ultrasonic wave transmitting and receiving device which is a standard of measuring (in this example, a top point selected from plural top points), depending on the result of calculation in the sonic wave speed calculating part 202.

The position calculating part 204 calculates the three-dimensional position data (three-dimensional position coordinate) of the position of the detection target depending on the result of calculation in the distance calculating part 203. This coordinate date is transmitted to the robot controlling device 102, and is used to control position of the robot hand. The buffer memory part 205 functions as a working area that temporarily stores data in the operation performed in the position detecting device 103.

Process for Detection of Position

Figure 3:
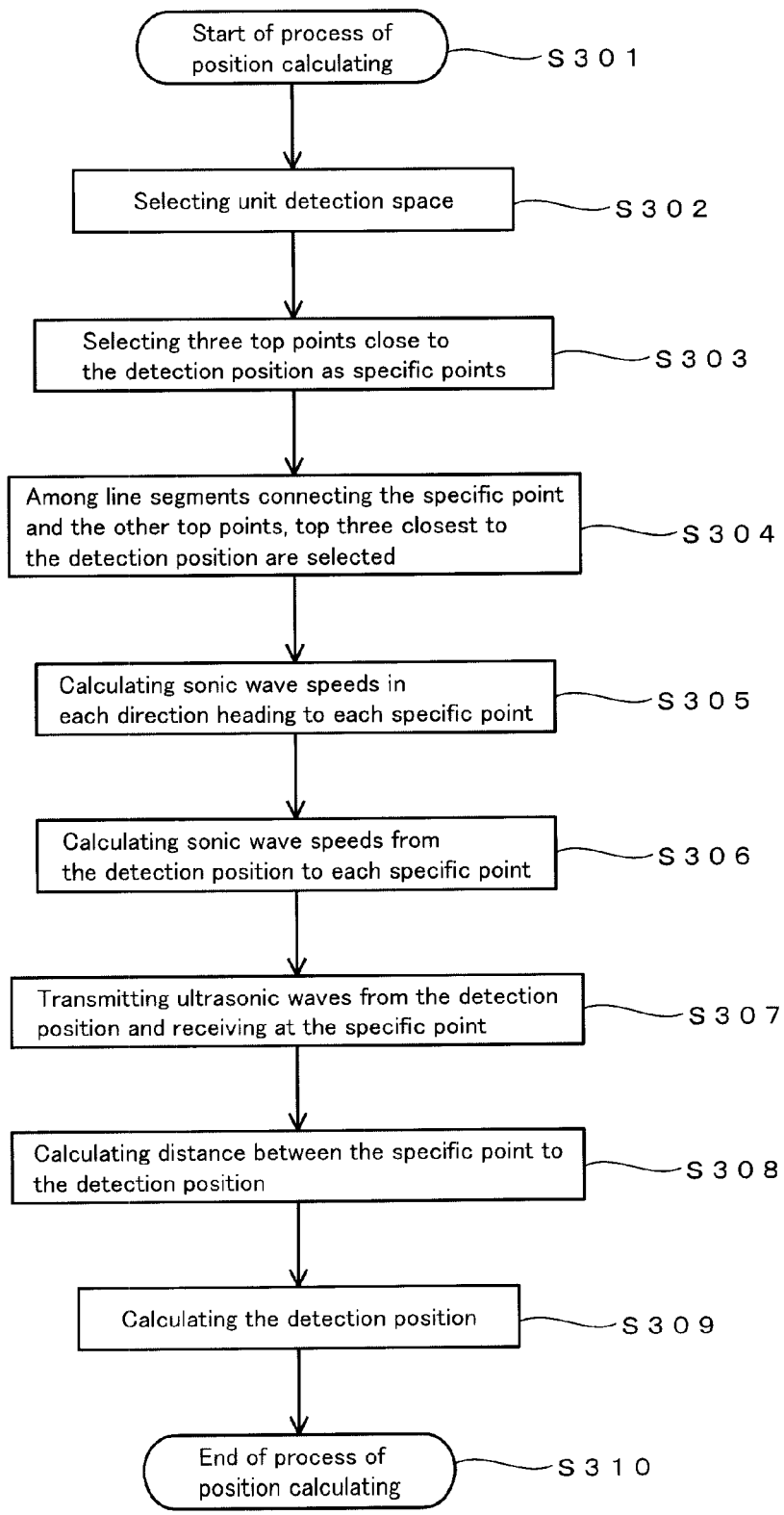
FIG. 3 is a flow chart diagram showing one example of steps to detect position.

Next, one example of detailed steps of process for detecting the position of the tip part 104 of the robot hand 101 will be given. FIG. 3 is a flow chart diagram showing the steps of the process performed in the position detecting device 103 of FIG. 2. The program, which conducts processes shown in FIG. 3, is stored in the memory region in the position detecting device 103, is loaded in an appropriate memory region, and is executed by CPU in the position detecting device 103. This action program can be one that is stored in an external memory medium and is provided therefrom.

When the process for calculating the position of the tip part 104 is started (step S301), first, the unit measuring space containing the detection position (the tip part 104) is selected (stet S302). This process is performed in the sonic wave speed calculating part 202. The unit measuring space can be selected from the regular hexahedrons 131, 132, 133. In the step S302, the information of the position of the tip part 104 upon controlling which can be obtained from the robot controlling device 102 is referred to, and it is detected which regular hexahedron contains the position for detection (the tip part 104). The position data of the tip part 104, which is obtained from the robot controlling device 102, is based on data for control so that the tip part 104 is positioned at the position. Therefore, the position data contains errors relative to its actual position.

Figure 4:
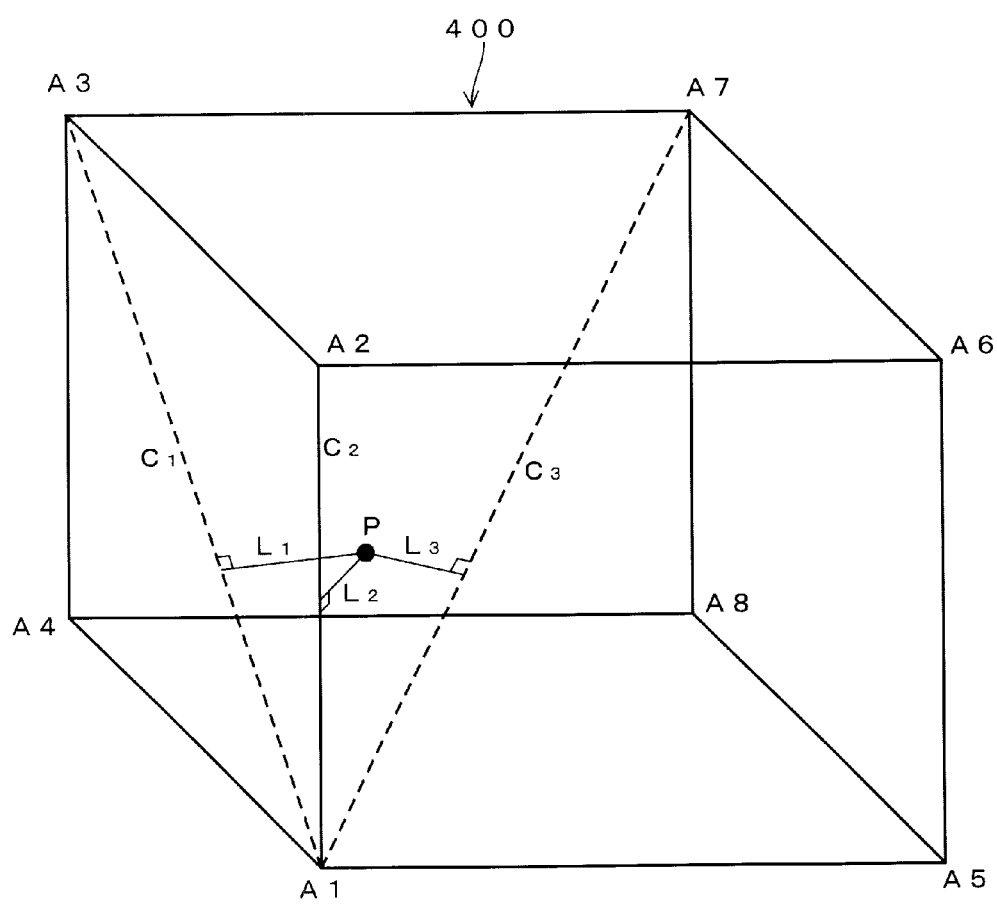
FIG. 4 is a diagram showing a principle for calculating sonic wave speed along a line connecting the detection position P and the top point A1.

Next, the process of the step S303 and its downstream steps are explained by way of practical example. FIG. 4 is a conceptual diagram to explain one example of the process. FIG. 4 shows the detection position P which corresponds to the tip part 104 of the robot hand 101. Furthermore, FIG. 4 shows a regular hexahedron 400 which corresponds to one of the regular hexahedrons 131 to 133.

In the case in which the regular hexahedron 400 in FIG. 4 is the regular hexahedron 132 in FIG. 1 for example, there is a relationship in that the ultrasonic wave transmitting and receiving device 116 of FIG. 1 is arranged at the top point A1, the ultrasonic wave transmitting and receiving device 118 is arranged at the top point A2, the ultrasonic wave transmitting and receiving device 117 is arranged at the top point A3, and the ultrasonic wave transmitting and receiving device 115 is arranged at the top point A4. Further, the ultrasonic wave transmitting and receiving device 120 is arranged at the top point A5, the ultrasonic wave transmitting and receiving device 122 is arranged at the top point A6, the ultrasonic wave transmitting and receiving device 121 is arranged at the top point A7, and the ultrasonic wave transmitting and receiving device 119 is arranged at the top point A8.

After the step S302, top three top points close to the detection position are selected as the specific points (step S303). When applying to the example of FIG. 4, as the top three specific points close to the detection position P, the top points A1, A2, and A3 are selected. This process is performed in the sonic wave speed calculating part 202.

In the case in which an obstacle such as a work or an arm part of the robot hand 101 enters between the detection position P and the specific point during the process of step S303, a top point next closest to the detection position P is selected as a specific point. This is performed to restrain detection error caused by interruption of spread of ultrasonic waves by the obstacle.

After the three specific points are selected, among line segments which connect one of the specific points and other top points (each top point of the regular hexahedron selected in the step S302), top three line segments close to the detection position are selected (step S304). When applying to the example of FIG. 4, concerning to the specific point A1, line segments $C_1$, $C_2$, and $C_3$ are selected. This process is performed in the sonic wave speed calculating part 202. The result of the process is stored in the buffer memory part 205. This process is performed regarding all of the three specific points (A1, A2, and A3).

In this time, a line segment in which an obstacle (workpiece or arm part of robot hand) is not positioned among line segments $C_1$, $C_2$, and $C_3$ not to interrupt a view, is selected. In the case in which a line segment in which a view is interrupted exists, selection of a specific point is retried, and a line segment next closest to the detection position P is selected.

Next, at each specific point, sonic wave speed which goes to the specific point along the three line segments selected in the step S304, is calculated (step S305). When applying to the example of FIG. 4, sonic wave speed which goes to A1 along the line segment $C_1$, sonic wave speed which goes to A1 along the line segment $C_2$, and sonic wave speed which goes to A1 along the line segment $C_3$ are calculated. For example, the sonic wave speed along the line segment $C_1$ can be calculated by action of the ultrasonic wave transmitting and receiving devices at both points of A1 and A3 of which the positions are already known and measuring the spread time of the sonic wave along the direction from the A3 point to the A1 point. The action controlling of the ultrasonic wave transmitting and receiving device during this process is performed in the ultrasonic wave transmitting and receiving device controlling part 201. The result of the process is stored in the buffer memory part 205. Similar processes are performed regarding the line segments $C_2$ and $C_3$. These processes are performed also regarding the specific points A2 and A3.

Next, sonic wave speeds which go from the detection position to the three specific points (sonic wave speed at the detection position is included) are calculated in the sonic wave speed calculating part 202 (step S306). When applying to the example of FIG. 4, sonic wave speed along the direction from the detection position P to the top point A1, sonic wave speed along the direction from the detection position P to the top point A2, and sonic wave speed along the direction from the detection position P to the top point A3 are calculated.

At this time, sonic wave speed along the direction connecting the detection position P and the specific point cannot be obtained directly. This is because the position of the detection position P is an inaccurate position that is obtained by controlling data. Therefore, in the example of FIG. 4, for example, sonic wave speed along the line connecting between the detection position P and the specific point A1 in the direction going to the specific point A1 is calculated as an approximate value, from sonic wave speed along the line segment $C_1$ in the direction going to the A1, sonic wave speed along the line segment $C_2$ in the direction going to the A1, and sonic wave speed along the line segment $C_3$ in the direction going to the A1.

In this calculation, against sonic wave speed along the line connecting between the detection position P and the specific point A1 in the direction going to the specific point A1, it is estimated that influence (relationship) of sonic wave speed along the line segment $C_2$ closest to the detection position P in the direction going to the specific point A1 is largest, influence of sonic wave speed along the line segment $C_3$ next closest to the detection position P in the direction going to the specific point A1 is medium, and influence of sonic wave speed along the line segment $C_1$ next closest to the detection position P in the direction going to the specific point A1 is small. Then, a formula is calculated in which sonic wave speeds along each line segment in the direction going to the A1 are weighted. By this formula, although it is an approximate formula, sonic wave speed along the direction connecting the detection position P and the specific point A1 in the direction going to A1 is calculated. In a similar manner, sonic wave speed along the direction going from the detection position P to the top point A2, and sonic wave speed along the direction going from the detection position P to the top point A3 are also calculated.

Next, by way of example in the case of FIG. 4, a practical calculating formula is explained. First, in FIG. 4, $L_1$ is a vertical line drawn from the detection position P to the line segment $C_1$. $L_2$ is a vertical line drawn from the detection position P to the line segment $C_2$. $L_3$ is a vertical line drawn from the detection position P to the line segment $C_3$. Furthermore, in the example of FIG. 4, there is a relationship $L_2<L_3<L_1$. In this condition, when sonic wave speed in the line segment $C_1$ to A1 is defined as v1, sonic wave speed in the line segment $C_2$ to A1 is defined as v2, and sonic wave speed in the line segment $C_3$ to A1 is defined as v3, sonic wave speed V along the direction from the detection position P to the top point A1 is calculated by the following formula.

$$V = \frac{\frac{L}{L_1}}{\frac{L}{L_1}+\frac{L}{L_2}+\frac{L}{L_3}}v1 + \frac{\frac{L}{L_2}}{\frac{L}{L_1}+\frac{L}{L_2}+\frac{L}{L_3}}v2 + \frac{\frac{L}{L_3}}{\frac{L}{L_1}+\frac{L}{L_2}+\frac{L}{L_3}}v3$$

In the formula, as coefficients of v1, v2 and v3, values each corresponding to distance from the line segments $C_1$ to $C_3$ against the detection position P are employed, and by the coefficients, effects of v1, v2 and v3 against V are weighted.

This is based on the following viewpoint. First, since the line segment $C_2$ is closest to the line segment connecting P and A1 (angles between them are smallest and their positions are closest), the vector of sonic wave speed v2 on the line segment $C_2$ is closest to the V vector. Next, since the line segment $C_3$ is next closest to the line segment connecting P and A1 (angles between them are next smallest and their positions are next closest), the vector of sonic wave speed v3 on the line segment $C_3$ is next closest to the V vector. Furthermore, since the line segment $C_1$ is next closest to the line segment connecting P and A1 (angles between them are next smallest and their positions are next closest), the vector of sonic wave speed v1 on the line segment $C_1$ is next closest to the V vector. Therefore, V can be approximately expressed by a primary conjugation formula v1, v2, and v3, in which weighting coefficients depending on distance are used. This is the above-mentioned formula.

In the step S306, after sonic wave speeds along lines from the detection position to each specific point are calculated, a controlling signal is output from the ultrasonic wave transmitting and receiving device controlling part 201, ultrasonic wave signal is output from the ultrasonic wave transmitting device 206 arranged at the tip part 104 (the detection position) of the robot hand 101 (see FIG. 1), and it is received at the three specific points. The distances from the detection position to the three specific points are calculated (step S308), based on the sonic wave speed calculated in the step S305 and the difference between the transmitted time from the ultrasonic wave transmitting device 206 and the received time at each specific point (that is, time necessary for the sonic wave to reach that point). This process is performed in the distance calculating part 203.

When applying to the example of FIG. 4, distance r1 between the detection position P and the specific point A1, distance r2 between the detection position P and the specific point A2, and distance r3 between the detection position P and the specific point A3 are calculated.

Next, spheres which have distances from the three specific points to the detection position as their radiuses, are described, and intersecting points of the surfaces of the spheres are obtained. Since two points are obtained as the intersecting points, one point which is close to the assumed detection position (position of the tip part 104 of the robot hand 101), or one point which is inside the selected regular hexahedron is obtained as a position data of the tip part 104 of the robot hand 101 (step S309). This process is performed in the position calculating part 204. This mechanism to specify the position is as the same as in GPS (Global Positioning System).

Position Controlling of the Robot Hand

Figure 5:
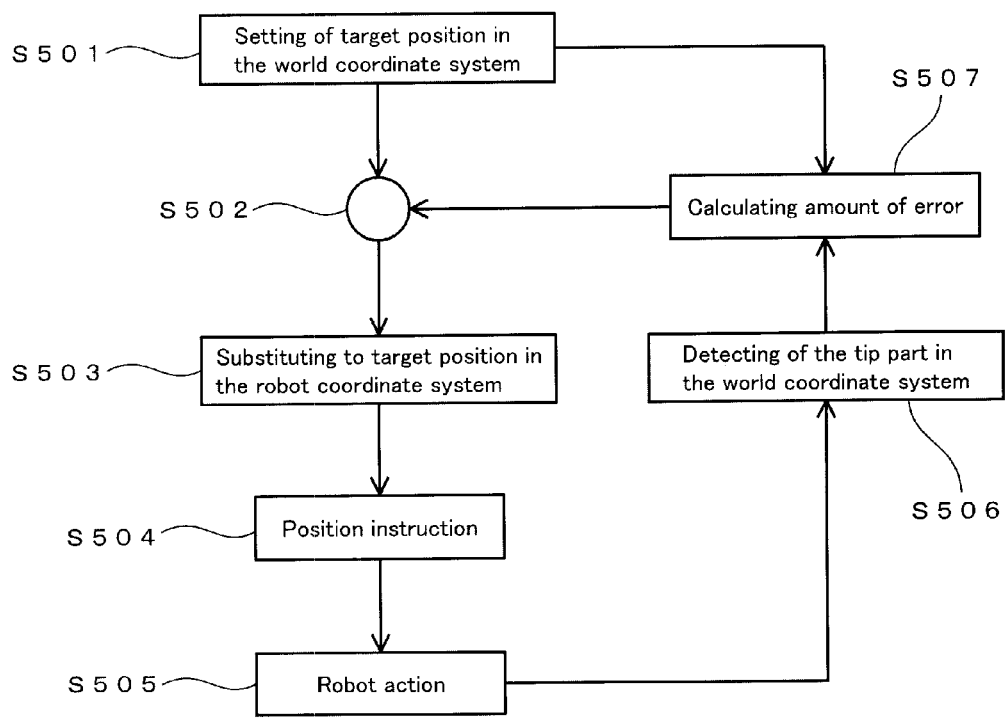
FIG. 5 is a flow diagram showing one example of controlling of robot hand.

FIG. 5 is a flow diagram showing flows of position controlling of the robot hand 101 performed in the robot controlling device 102. In FIG. 5, the world coordinate system is a coordinate system (for example, a three-dimensional orthogonal coordinate system or a polar coordinate system) that is fixed in an environment in which the robot hand 101 is arranged (robot hand system 100). The robot coordinate system is a coordinate system that is fixed at the robot side and is used when each joint axis is moved.

Upon controlling of the position, first, a target position in the world coordinate system is set (S501). This target position is output to step S502 and is given to a step that calculates the amount of mismatch of step S507. In the step S502, the amount of mismatch between the target position calculated in the step S507 and the actual measured position is given, and this amount of mismatch and data of target position given in the step S501 are given to step S503.

In the step S503, a coordinate data of which mismatch against the target position is considered is given, and this is converted to the robot coordinate system. Based on the converted coordinate data of the robot coordinate system, motors which activate each joint part are instructed to act (step S504), and the position controlling of the robot hand 101 (see FIG. 1) is performed (step S505).

In this time, position information in the world coordinate system of the tip part 104 of the robot hand 101 is detected by a process of FIG. 3 in the position detecting device 103 (step S506), and based on that, differences between the target position of the tip part 104 and the actual position (amount of mismatch) are calculated (step S507). This amount of mismatch is given to the step S502, and is used as position controlling of the robot hand 101.

According to this process, position controlling is performed while correcting mismatch of the position of the tip part 104 of the robot hand 101 and the target position.

Superiority

By the embodiment explained as above, detection of a position of the tip part 104 of the robot hand 101 is performed by using ultrasonic waves. At this time, sonic wave speed along spread routes of sonic waves from the tip part 104 to the specific receiving device is calculated depending on sonic wave speed among the ultrasonic wave transmitting and receiving devices arranged at each top point of the settled unit detection space (regular hexahedron in this case).

In this example, using sonic wave speed of the three standard routes close to the route from the tip part 104 to the specific receiving device, and that using a calculation formula that is weighted depending on distance to the route, influence by the three standard routes ($C_1$, $C_2$, and $C_3$ in FIG. 4) on the route is calculated. Therefore, although it is approximate, a sonic wave speed which is close to the actual value including effects of parameters such as temperature, humidity, density and air flow along the route from the detection position P (the tip part 104) to the specific receiving device, can be obtained. In this way, position of the tip part 104 is detected in conditions that influence temporal alteration and spatial alteration of these parameters are reduced. That is, detection error of position of the tip part 104 owing to differences in sonic wave speed because of temperature or wind can be reduced.

By the method shown in the present embodiment, since sonic wave speed of a standard route of the top three closest to the tip part 104 are used, the value of sonic wave speed along the direction from the detection position P to the specific receiving device (sonic wave speed at the detection position) can be calculated in conditions in which the surrounding environment of the detection position P is reflected more correctly. Furthermore, since an angle between a direction of each standard route and the direction of a route from the detection position to the specific receiving device is not more than 45 degrees, even in the case in which there is a difference in sonic wave speed based on differences in direction, the value of the sonic wave speed along a direction from the detection position to the specific receiving device (sonic wave speed at the detection position) can be calculated accurately.

In addition, as shown in regular hexahedrons 131 to 133, since the unit detection spaces are prepared in plural, more detailed alteration of sonic wave speed can be observed. In this way, even in environments in which effects of spatial temperature alteration and air flow are great, high detection accuracy of the position of the tip part 104 can be maintained.

When calculating sonic wave speed from the detection position P to the receiving device of position of A1 in the example of FIG. 4, an effect of sonic wave speed along the standard route $C_2$ to A1 which is closest to this route is assumed to be largest, an effect of sonic wave speed along the standard route $C_3$ to A1 which is next closest is weighted corresponding to a difference of the distance. Furthermore, an effect of sonic wave speed along the standard route $C_1$ to A1 which is third closest is weighted corresponding to differences of the distance (see the formula). In this way, sonic wave speed at the detection position P to the direction of the top point A1 can be obtained in conditions in which the surrounding environment (conditions of temperature, wind or the like) of the detection position P is reflected more correctly.

In addition, when calculating sonic wave speed V from the detection position P to the receiving device of position A1, since $C_1$, $C_2$, $C_3$ and A1 are set as the standard routes and the top point of trigonal pyramid mutually and each side of the trigonal pyramid including the detection position P inside is selected, accuracy of the sonic wave speed V obtained from the sonic wave speed at each standard route can be increased.

That is, when calculating the sonic wave speed V from the detection position P to the receiving device of A1 position, since the sonic wave speeds along the standard routes $C_1$, $C_2$, and $C_3$ to A1 have direction close to the direction of sonic wave speed V, error between the sonic wave speeds calculated with sonic wave speed at the standard routes $C_1$, $C_2$, and $C_3$ (v1, v2, and v3) and the actual value can be reduced. In particular in this method, influence of direction of air flow (influence of wind) can be considered.

In addition, by selecting the top three closest points to the detection position P as the specific points A1, A2 and A3, increases of error depending on expanding of spread distance of sonic wave can be restrained.

In addition, by selecting the three specific points A1, A2 and A3, and by obtaining the detection position P according to the intersecting position of three spheres having the specific points as a center, the three dimensional position can be accurately detected.

Selectable Options

In the above-mentioned examples, a hexahedron is explained as the unit detection space; however, shapes other than a hexahedron can be employed as long as it is polyhedron. The medium in which sonic wave is spread is not limited to air, and inert gas or the like can be employed as long as it is a gas. Furthermore, the present invention can be employed even in an environment containing mist or smoke. Not only the position of the tip of the robot hand, but also the position of the joint part or the like of the robot hand, can be detected. Furthermore, other than the robot hand, the present invention can be employed for a purpose for detecting three dimensional position of a work or a jig.

Although FIG. 1 shows a system including one robot hand, there may be multiple robot hands. Furthermore, the number of the unit detection spaces (regular hexahedrons 131 to 133) can be increased, or decreased to one unit detection space.

Although the example in which position of the detection position P is specified by calculating distances from the three top points A1, A2, and A3 to the detection position P in FIG. 4, the top point (specific point) which is a standard can be four or more. In addition, by selecting only the top point A1 or by selecting only top points A1 and A2, distance(s) from there to the detection position P is (are) calculated, and the position of the detection position P can be specified based on the result.

In the case in which four or more standard points are selected to calculate distance to the detection position, calculation accuracy of position can be further increased. In the case in which two standard points are selected to calculate distance to the detection position, the detection position is on a circle that is made by intersecting two spheres having each these two points as a center. In this case, using the calculated data of which detection position exists on the circle so as to correct assumed position obtained from another device (for example, control data of robot arm), accuracy of position detection can be increased.

In the case in which the number of the standard point to calculate distance to the detection position is one, the detection position exists on the sphere having this point as the center. In this case, using the calculated data of which the detection position exists on the sphere so as to correct an assumed position obtained from another device (for example, control data of the robot arm), accuracy of position detection can be increased.

Although three line segments $C_1$, $C_2$ and $C_3$ are selected in the formula, this number can be one, two, four or more. Accuracy of calculated sonic wave speed at the detection position P is increased as the number of line segments (for example, $C_1$, $C_2$ or the like) connecting among the ultrasonic wave transmitting and receiving devices used is increased. However, from the viewpoints of increasing operating ratio and reducing load against the operating element, it is advantageous that the number be low.

The present invention can be applied to a technique for detecting position using ultrasonic waves. In addition, it can be applied to a technique using ultrasonic waves specific to the position of a robot hand.

What is claimed is:

1. A position detecting device, comprising:
   an ultrasonic wave transmitting device arranged at a part to be detected,
   plural ultrasonic wave transmitting and receiving devices, each of said transmitting and receiving devices being spaced from the part to be detected,
   a sonic wave speed calculating device adapted to calculate sonic wave speed of each of said plural ultrasonic wave transmitting and receiving devices and further adapted to calculate sonic wave speed at the part to be detected, said sonic wave speed at the part to be detected depending upon the sonic wave speed of each of said plural ultrasonic wave transmitting and receiving devices, and
   a distance calculating device adapted to calculate a distance from the ultrasonic wave transmitting device arranged at the part to be detected to a specific ultrasonic wave transmitting and receiving device of said plurality of ultrasonic wave transmitting and receiving devices, depending on a spread time of ultrasonic waves from the ultrasonic wave transmitting device arranged at the part to be detected to the specific ultrasonic wave transmitting and receiving device, and depending on the sonic wave speed at the part to be detected;
   wherein the plural ultrasonic wave transmitting and receiving devices are arranged at corners of plural imaginary polyhedrons, the part to be detected is contained in one of the plural imaginary polyhedrons, and the sonic wave speed calculating device calculates sonic wave speed at the part to be detected depending on sonic wave speed between the plural ultrasonic wave transmitting and receiving devices arranged at the corners of the one imaginary polyhedron containing the part to be detected.

2. The position detecting device according to claim 1, wherein one of the plural ultrasonic wave transmitting and receiving devices is used as a receiving device, another of the plural ultrasonic wave transmitting and receiving devices is used as a transmitting device,
   the sonic wave speed calculating device calculates sonic wave speed between the transmitting device and the receiving device and calculates sonic wave speed at the part to be detected depending on the sonic wave speed between the transmitting device and the receiving device calculated, and
   the distance calculating device calculates distance between the part to be detected and the receiving device depending on sonic wave speed at the part to be detected and depending on spread time of which transmitted waves from the ultrasonic wave transmitting device arranged at the part to be detected are received at the receiving device.

3. The position detecting device according to claim 1, wherein line segments each connecting between the ultrasonic wave transmitting and receiving devices exist in plural,
   sonic wave speeds at the plural line segments are calculated as sonic wave speeds between ultrasonic wave transmitting and receiving devices, and
   in the process calculating sonic wave speeds at the part to be detected, a process in which sonic wave speeds at a line segment relatively close to the part to be detected have first effects on sonic wave speeds at the part to be detected, and sonic wave speeds at a line segment relatively far from the part to be detected have second effects on sonic wave speed at the part to be detected among sonic wave speeds at the plural line segments, is performed, and wherein said first effects are relatively larger than said second effects.

4. The position detecting device according to claim 1, wherein the part to be detected is a tip part of robot hand.

5. The position detecting device according to claim 2, wherein the receiving device is a closest one of said plurality of ultrasonic wave transmitting and receiving devices to the part to be detected.

6. The position detecting device according to claim 2, further comprising a position calculating device,
   wherein the position calculating device selects three different ultrasonic wave transmitting and receiving devices as the receiving devices, calculates the distances between the part to be detected and the receiving device as three values corresponding to the three different ultrasonic wave transmitting and receiving devices respectively, and calculates the position of the part to be detected depending on an intersecting point of three spheres each having the three values as a radius.

7. The position detecting device according to claim 3, wherein the sonic wave speed at a line segment relatively close to the part to be detected is sonic wave speed at the line segment closest to the part to be detected.

8. The position detecting device according to claim 3, wherein the plural line segments form a trigonal pyramid, and the part to be detected is contained in the trigonal pyramid.

9. The position detecting device according to claim 3, wherein the calculation of sonic wave speed at the part to be detected by the sonic wave speed calculating device is performed using formula L, under conditions in which the length of a vertical line drawn from the part to be detected against one of the plural line segments is defined as Li, i being a natural number not including 0, $$L = L1 + L2 + L3 + \ldots,$$

and by the following formula V $$V = \frac{\frac{L}{L_1}}{\frac{L}{L_1} + \frac{L}{L_2} + \frac{L}{L_3}} v1 + \frac{\frac{L}{L_2}}{\frac{L}{L_1} + \frac{L}{L_2} + \frac{L}{L_3}} v2 + \frac{\frac{L}{L_3}}{\frac{L}{L_1} + \frac{L}{L_2} + \frac{L}{L_3}} v3$$

under conditions in which sonic wave speeds at each of the plural line segments are defined as vi, i being a natural number not including 0.

10. A position detecting method, comprising the steps of:
providing an ultrasonic wave transmitting device arranged at a part whose position is being detected,
providing a plurality of ultrasonic wave transmitting and receiving devices, each of said transmitting and receiving devices being spaced from the part to be detected,
calculating sonic wave speed among said plurality of ultrasonic wave transmitting and receiving devices and calculating sonic wave speed at the part to be detected depending on the sonic wave speed among said plurality of ultrasonic wave transmitting and receiving devices, and
calculating a distance from the ultrasonic wave transmitting device arranged at the part to be detected to a specific one of said plurality of ultrasonic wave transmitting and receiving device, depending on a spread time of ultrasonic waves from the ultrasonic wave transmitting device arranged at the part to be detected to the specific one of said plurality of ultrasonic wave transmitting and receiving devices, and depending on the sonic wave speed at the part to be detected;
wherein the plural ultrasonic wave transmitting and receiving devices are arranged at corners of plural imaginary polyhedrons, the part to be detected is contained in one of the plural imaginary polyhedrons, and the sonic wave speed calculating device calculates sonic wave speed at the part to be detected depending on sonic wave speed between the plural ultrasonic wave transmitting and receiving devices arranged at the corners of the one imaginary polyhedron containing the part to be detected.

11. The position detecting method according to claim 10, wherein one of the plurality of ultrasonic wave transmitting and receiving devices is used as a receiving device, another of the plurality of ultrasonic wave transmitting and receiving devices is used as a transmitting device,
in the calculating sonic wave speed step, sonic wave speed between the transmitting device and the receiving device is calculated and sonic wave speed at the part to be detected is calculated depending on the sonic wave speed between the transmitting device and the receiving device, and
in the calculating distance step, distance between the part to be detected and the receiving device is calculated depending on sonic wave speed at the part to be detected and depending on spread time of which transmitted waves from the ultrasonic wave transmitting device arranged at the part to be detected is received at the receiving device.

12. The position detecting method according to claim 10, wherein line segments each connecting between the ultrasonic wave transmitting and receiving devices exist in plural,
sonic wave speeds at the plural line segments are calculated as sonic wave speeds between ultrasonic wave transmitting and receiving devices, and
in the calculating sonic wave speed step, a process in which sonic wave speed at a line segment relatively close to the part to be detected have large effects on sonic wave speed at the part to be detected and sonic wave speed at a line segment relatively far from the part to be detected have small effects on sonic wave speed at the part to be detected among sonic wave speeds at the plural line segments, is performed.

* * * * *